INVENTORS
JAMES E. MACAFEE AND
THOMAS J. WALL

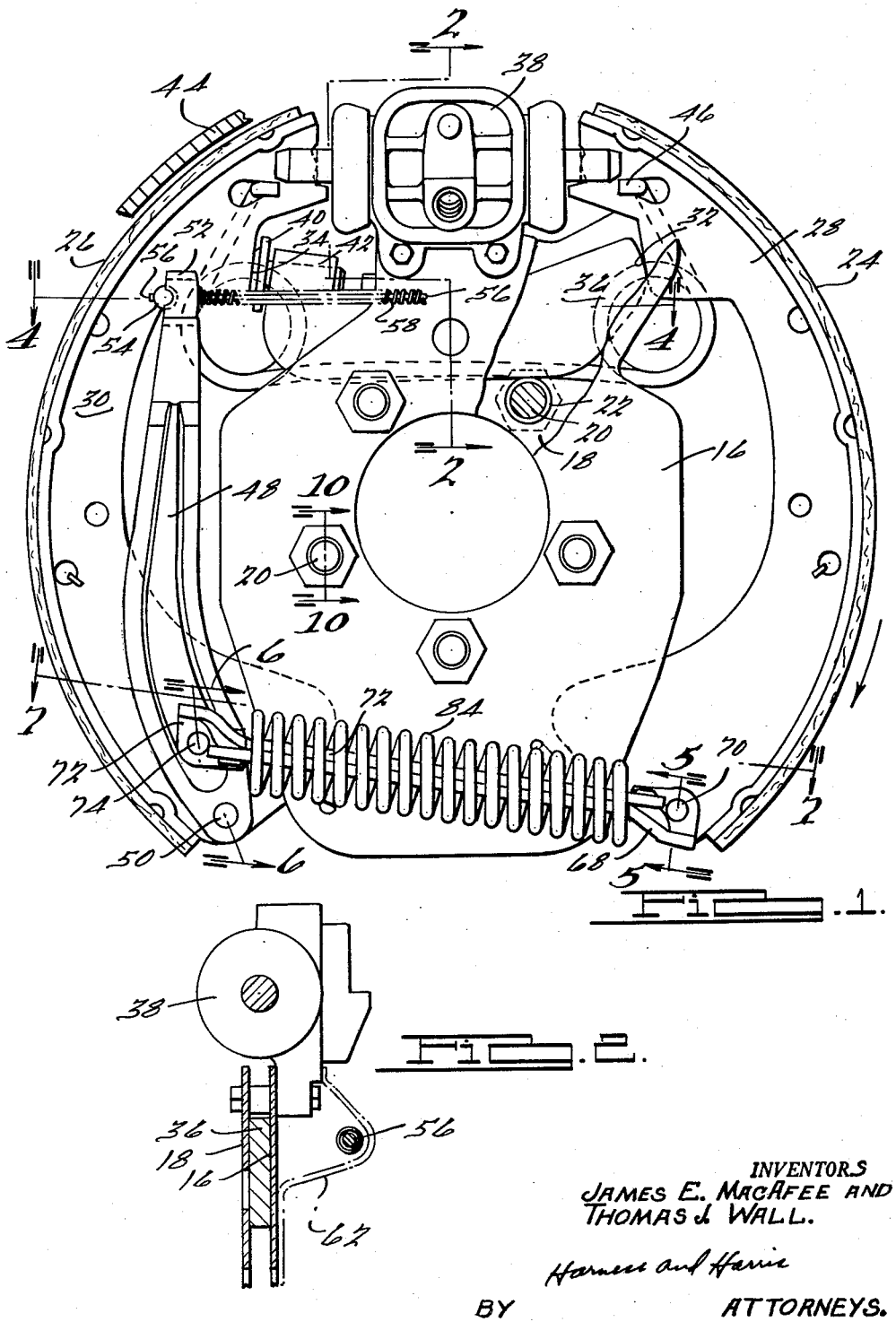

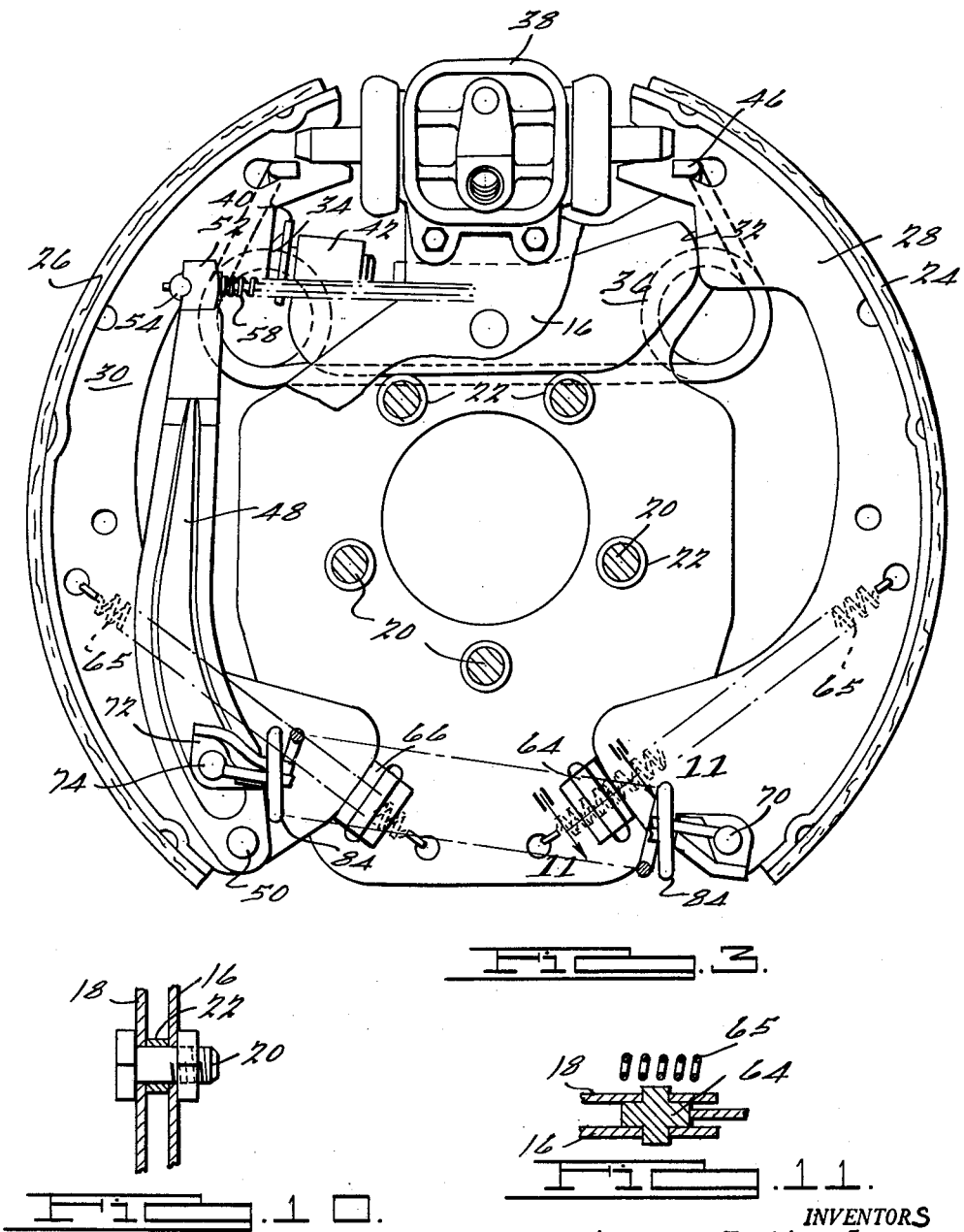

Harness and Harris
BY                ATTORNEYS.

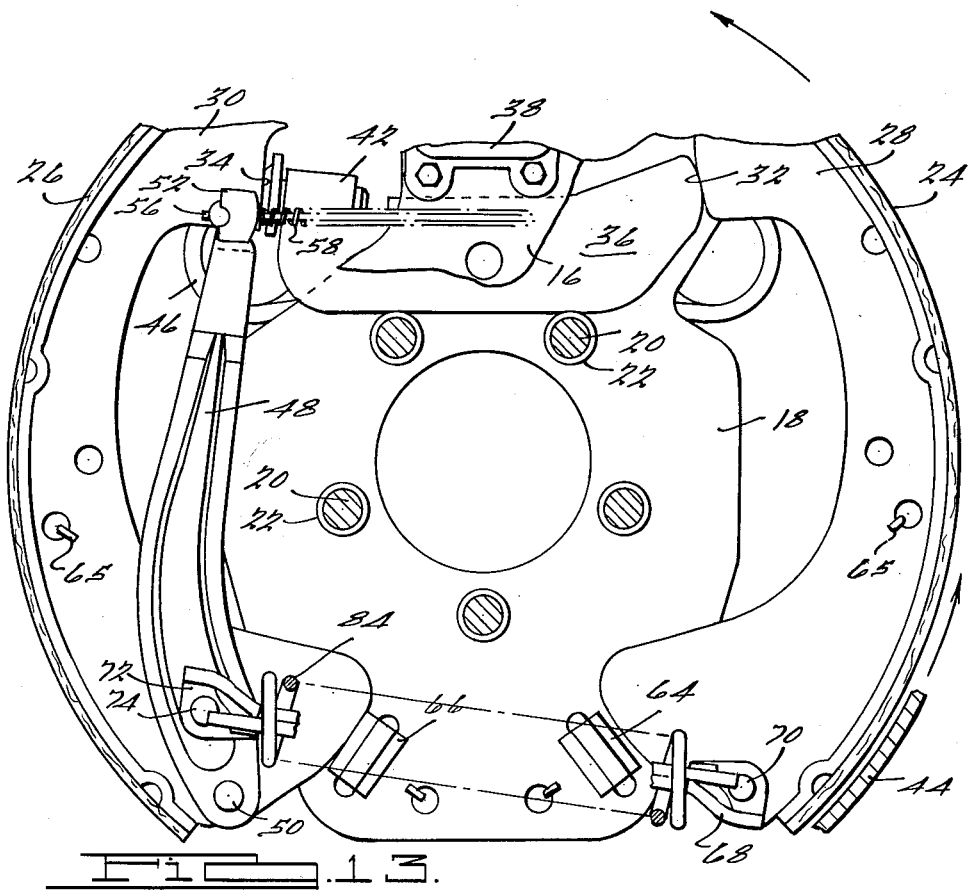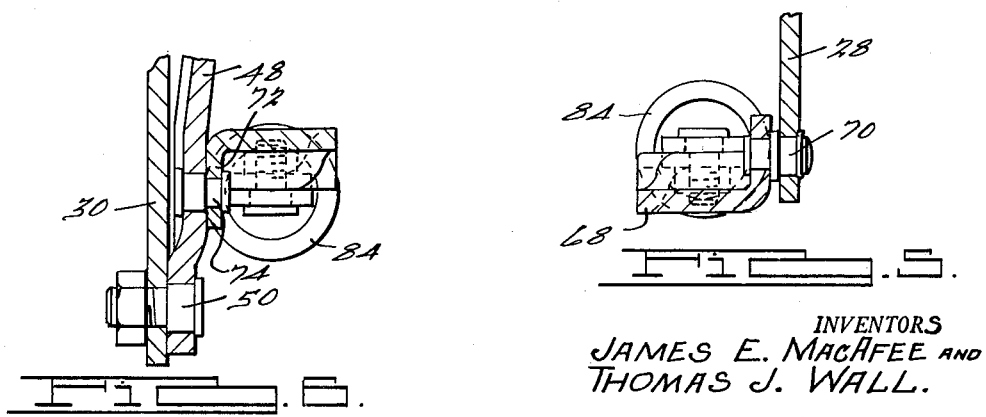

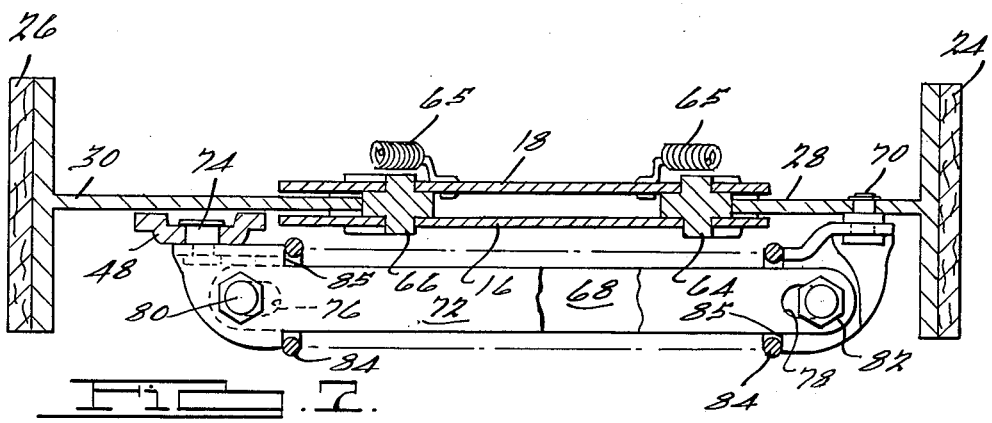
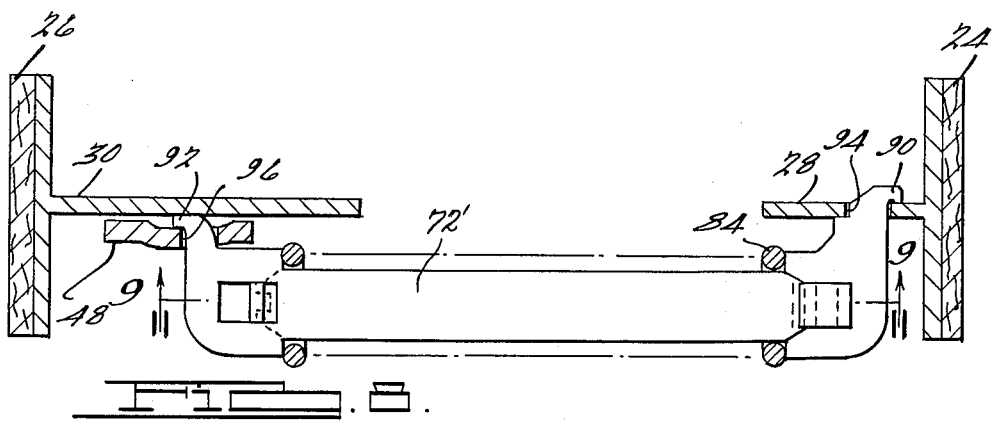
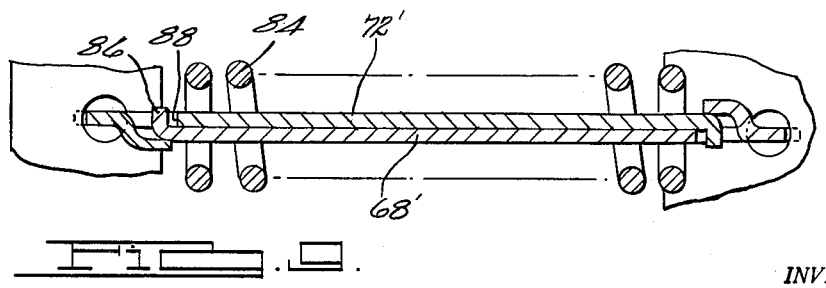

United States Patent Office 3,089,566
Patented May 14, 1963

3,089,566
BRAKE MECHANISM
James E. MacAfee, Troy, and Thomas J. Wall, Southfield, Mich., assignors to Chrysler Corporation, Highland Park, Mich., a corporation of Delaware
Filed Aug. 4, 1960, Ser. No. 47,412
8 Claims. (Cl. 188—78)

This invention relates to improvements in brake structure and in particular, to improvements in the emergency or parking brake feature, hereinafter called "auxiliary" brake, of the conventional leading-trailing service brake structure.

A principal object of the present invention is to provide a conventional leading-trailing brake system with an auxiliary brake mechanism capable of developing unusual emergency or parking torque independently of the service brake operation through the use of substantially all of the brake shoe contacting surface. This object is accomplished by the provision of a floating link interconnecting the two brake shoes adjacent their toe ends and by the provision of a power leverage structure adjacent their opposite ends. In the operation of the brake, the leverage structure when operated to spread the brake shoes adjacent said opposite ends apart allows the rotation of the brake shoes and floating link in such a manner that the floating link will transmit force from one brake shoe to the other and thereby effectively force both brake shoes against the drum.

A further object of this invention is to provide the above auxiliary brake structure with an energy storing device such as a spring so that when the auxiliary brake is applied while the service brake is actuated the auxiliary brake will become fully effective through the stored energy in the spring after the service brake is released.

Further objects and advantages of the invention will become apparent from the following description and drawings in which:

FIGURE 1 represents a partly broken away front view of a service type brake provided with applicants' auxiliary linkage;

FIGURE 2 is a cross-sectional view of the brake of FIGURE 1 taken along the line 2—2 thereof in the direction of the arrows;

FIGURE 3 represents a view of the brake of FIGURE 1 with one of the supporting plates removed;

FIGURE 5 represents a cross-sectional view of the brake of FIGURE 1 taken along the line 5—5 thereof in the direction of the arrows;

FIGURE 6 represents a cross-sectional view of the brake of FIGURE 1 taken along the line 6—6 thereof in the direction of the arrows;

FIGURE 7 represents a top view of the energy storing linkage of FIGURE 1;

FIGURE 8 represents a modification of the energy storing linkage;

FIGURE 9 represents a cross-sectional view of the structure of FIGURE 8 taken along the line 9—9 thereof in the direction of the arrows;

FIGURE 10 represents a cross-sectional view of the supporting plate bolt and spacing structure of FIGURE 1 corresponding to line 10—10 thereof;

FIGURE 11 represents a cross-sectional view of the anchor posts of FIGURE 3 taken along line 11—11 thereof;

FIGURE 13 represents an actuated condition of the auxiliary brake structure during rearward motion of the vehicle.

Figure 12:
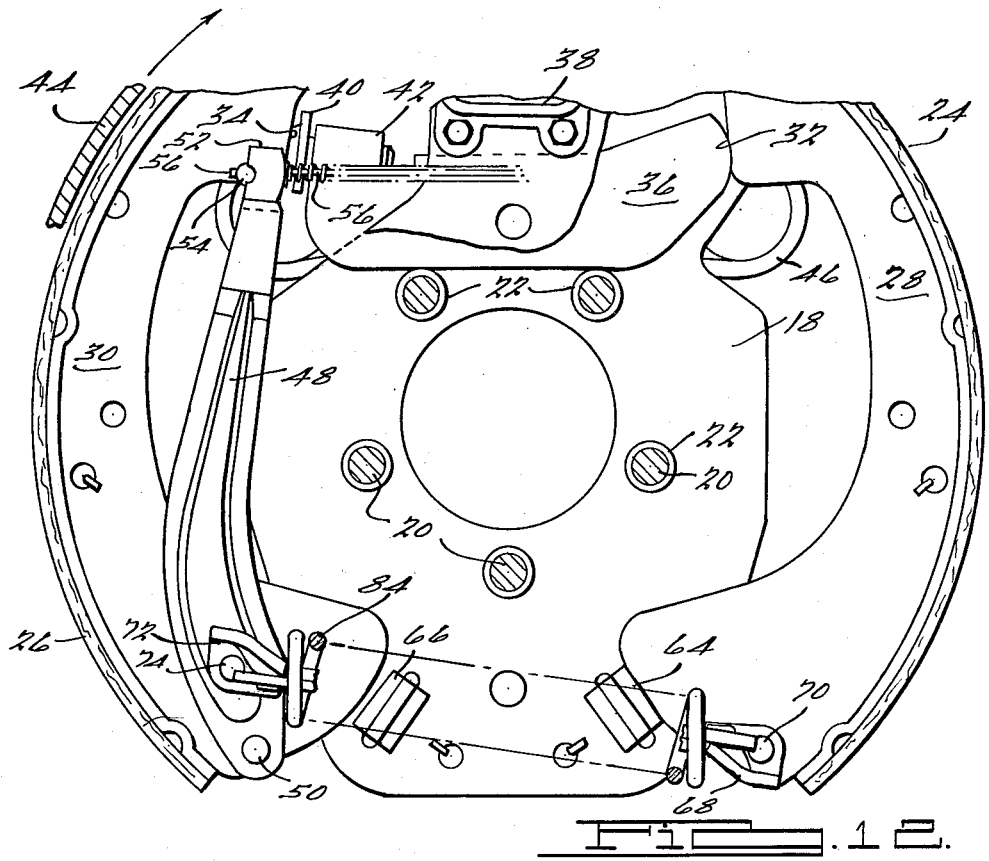
FIGURE 12 represents an actuated condition of the auxiliary brake structure during forward motion of the vehicle.

Referring to the drawings, a pair of support plates 16 and 18 are bolted together by bolts 20 and are spaced from each other by spacing sleeves 22 (see FIGURE 10). These supporting plates are adapted for connection to either the stationary portion of the front wheel mounting structure of a vehicle, or the rear axle carrier structure thereof. Mounted between these plates is a pair of brake shoes 24 and 26 which are provided with rigidifying flanges 28 and 30, respectively. These flanges are provided respectively with shoulders 32 and 34 against which a floating link 36 bears when the hydraulic brake cylinder 38 is in an unactuated condition. A return spring 46 urges the toe ends of the brake shoes in tight contact with the floating link 36. The floating link 36 has a threaded stud 40 which can be screwed in and out of a threaded sleeve portion 42 of the link 36 to properly space the toe or upper portions of the brake shoes with respect to the brake drum 44 (segment thereof shown).

Figure 4:
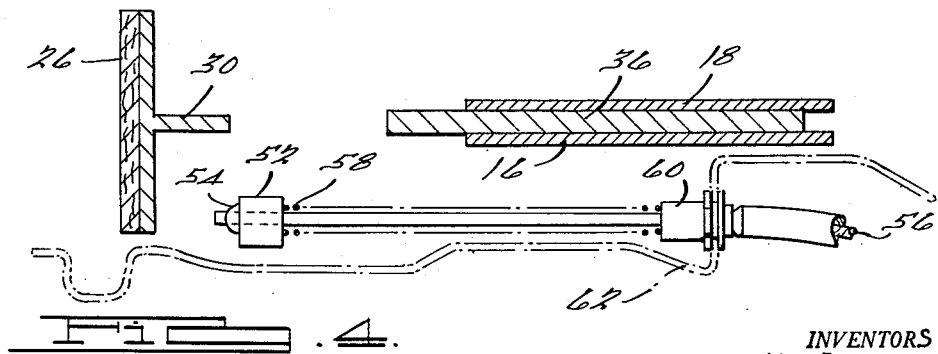
FIGURE 4 represents a cross-sectional view of the brake of FIGURE 1 taken along the line 4—4 thereof in the direction of the arrows.

The auxiliary brake lever 48 is pivotally mounted by stud 50 to the heel end of flange 30 of brake shoe 26 and is provided at its other end with a socket 52 which receives a ball 54 secured to a manually operable auxiliary brake actuating cable 56. As shown in FIGURE 4, a lever return spring 58 interposed between the socket 52 and a cable mounting flange 60 supported by dust shield 62 which is secured to support plate 16 resiliently urges socket 52 and lever 48 to a position which causes the heel portions of the brake shoes 24 and 26 to abut the anchor posts 64 and 66 respectively. Return springs 65 urge the heel ends of the shoes toward the anchor posts 64, 66.

Referring to the auxiliary linkage structure in FIGURE 1, a spreading member 68 is pivotally mounted by stud 70 to the heel portion of flange 28 of shoe 24 and another spreading member 72 is pivotally connected by stud 74 to the lower part of lever 48. As shown in FIGURE 7, these spreading members are provided with aligned slots 76 and 78 respectively which receive bolts 80 and 82. As lever 48 is rotated to the right in FIGURE 1, the energy storing coil spring 84 abutting shoulders 85 on each of the spreading members 68 and 72 forces the heel portions of each of the brake shoe flanges 28 and 30 off of their respective anchor posts 64 and 66 until the shoes 24, 26 engage the drum 44 after which the spring 84 continues to be compressed and the members 68 and 72 shorten their overall length by movement of the bolts 80, 82 within slots 76 and 78. Consequently, any motion of the brake shoes outwardly thereafter either caused by releasing of the service brake or by motion of the drum 44 causing rotation of the brake shoe structure will allow the spring 84 to expand and release some of its stored energy to tightly force the brake shoes against the drum.

It is particularly noted that the energy storing spring 84 can be located at any convenient place. For example, a tension spring could be made a part of the brake actuating cable 56 so that as the cable is pulled and the brake shoe segments are stopped by the drum during the energized condition of cylinder 38, auxiliary braking energy is stored in the spring upon further pulling of the cable.

In FIGURES 8 and 9, the spreading members 68' and 72' may be modified to use tab portions 86 and slots 88 instead of the slots and bolts 76, 78, 80 and 82 of the structure of FIGURE 7. Also, the attachment of the spreading members 68' and 72' in FIGURES 8 and 9 to the flange portions of one of the shoes 24 and to the lever 48 may be made by the bent-over tab portions 90 and 92, respectively, which are pivotally mounted in apertures 94 and 96.

Referring to FIGURE 12, when the brake drum 44 is rotating in a clockwise direction such as during forward motion of the vehicle and the auxiliary brake is applied according to the present invention, the brake shoes 26 will engage the drum and be moved in a clockwise direction. This movement of shoe 26 will be transmitted through the floating link 36 to the toe portion of brake shoe 24 which upon contact with the drum will be moved in a clockwise direction and downwardly along its anchor 64. The overall effect of this rotation will be to move substantially the entire braking surface of both brake shoes 24, 26 in a wedge-like manner tightly against the brake drum 44. Thus the auxiliary brake linkage is such that it converts the leading trailing shoe service brakes into a self energizing servo braking system for emergency or parking brake application. In FIGURE 13, the rotation of the brake drum is counterclockwise and the rotation of the brake shoes and the auxiliary brake linkage will be in a counterclockwise direction producing the same effect, although in a reverse direction to that obtained by the system shown in FIGURE 12.

A significant advantage and use of the energy storing spring 84 is demonstrated by first applying the service brake by the actuation of hydraulic cylinder 38 which moves the toe portions of shoes 24 and 26 outwardly against the rotating brake drum. If the drum is moving in a clockwise direction the leading brake shoe 24 will be rotated in a clockwise direction and will move downwardly on its anchor post 64 to become tightly forced against the brake drum. At the same time a portion of trailing brake shoe 26 adjacent the toe portion will also be wedged against the brake drum. Servo action between the shoes 24, 26 is not attained at this time because the trailing shoe portion 34 has been disengaged from the floating link portion 40 by the shoe expanding action of cylinder 38. If the emergency brake linkage shown is actuated at this time, the heel portion of trailing shoe 26 will be expanded outwardly to become engaged with the brake drum 44 and then substantially all of the surface of both brake shoes 24, 26 will be in engagement with the brake drum. If the spring 84 were not present in the auxiliary brake linkage a release of the hydraulic force of cylinder 38 during actuation of the auxiliary brake would result in loss of contact of the toe portions of the shoes 24, 26 with the drum 44. However, because the spring 84 of the auxiliary brake linkage has been compressed during auxiliary brake application while the service brakes were also applied, on release of the service brakes by deactivation of cylinder 38 the compressed spring 84 expands and acts to urge the heel portion of the trailing shoe 26 outwardly into engagement with the brake drum 44. Rotating brake drum 44 then picks up trailing shoe 26 and moves it clockwise (FIG. 12) so that its toe portion 34, which is now in engagement with the portion 40 of the floating link 36 because of the release of the service brakes, transmits a braking force through the servo linkage 36 to the primary shoe 24. Thus both shoes 24, 26 are now applied to the drum 44 to provide an effective, servo actuated, auxiliary brake.

Since operation of the auxiliary brake mechanism acts to lift the heel portion of the shoe 26 off the anchor 66 whereas service brake operation acts to apply the heel portions of each of the brake shoes 24, 26 to the respective anchors 64, 66, it will be seen that the functions of the auxiliary brake and the service brake are not compatible. Because the hydraulic action of the service brakes is stronger than the manual actuation of the auxiliary brake, the service brakes prevent the auxiliary brake from being applied as a link transmitted servo brake during simultaneous actuation of the service brakes and the auxiliary brake. In order to make the two braking systems compatible with each other the energy storage spring 84 has been mounted in the auxiliary brake linkage mechanism so that it may be compressed to store energy during simultaneous actuation of the service and auxiliary braking systems. This simultaneous actuation applies the service brakes and compresses the spring 84 of the auxiliary braking system so that the stored energy is available for subsequent expansion of the brake shoes by the auxiliary braking system after the service brakes have been released.

It is seen, therefore, that a significant advance in the emergency or parking brake art is attained through the use of the energy storing spring 84 which ensures substantially total brake shoe contact with the drum for emergency or parking braking even though the auxiliary brake is applied during the operation of the service brake.

We claim:

1. In a drum-type brake structure having a supporting body with brake shoe anchor means thereon, first shoe actuating power means mounted on said body, a pair of brake shoes each having first portions shiftably engaged with said anchor means and second portions in engagement with said first power means and adapted to be moved apart thereby, and second shoe actuating power means operable independently of said first power means engageable with said brake shoes at points spaced from said first power means and operable to move said shoes apart, said second power means including energy storing means which functions substantially as a force transmitting means during independent operation of said second power means and is also actuated to store energy during simultaneous operation of said first and second power means for moving said shoes apart after deactivation of said first power means and floating link means interconnecting said shoes at points spaced from said second power means to provide fulcrum points for said shoes and providing means to transmit force from one shoe to the other during independent activation of said second power means.

2. In a drum-type brake structure having a supporting body with brake shoe anchor means thereon, first shoe actuating power means mounted on said body, a pair of brake shoes each having first portions engaged with said anchor means and second portions in engagement with said first power means and adapted to be moved apart thereby, and second shoe actuating power means interconnecting said shoes and operable independently of said first power means engageable with said brake shoes at points spaced from said first power means and operable to move said shoes apart, said second power means including energy storing means which functions substantially as a force transmitting means during independent operation of said second power means and is also actuated to store energy during simultaneous application of said first and second power means for moving said shoes apart after deactivation of said first power means and floating means linking said shoes at points spaced from said second power means to provide fulcrum points for said shoes and providing means to transmit braking force from one shoe to the other during independent activation of said second power means, said anchor means on said support providing reaction means for both independently and jointly engaging said shoes with the associated brake drum depending on which of said power means is activated.

3. In a drum-type brake structure having a supporting body with brake shoe anchor means thereon, first shoe actuating power means mounted on said body, a pair of brake shoes each having first portions seated on said anchor means and second portions in engagement with said first power means and adapted to be moved apart thereby, and second shoe actuating power means operable independently of said first power means to engage and interconnect said brake shoes at points spaced from said first power means providing means to move said shoes apart, said second power means having energy storing means which functions substantially as a force transmitting means during independent operation of said second power means and is also actuated to store energy during simultaneous application of said first and second power means for moving said shoes apart after deactivation of said first power means and floating means linking said shoes at points spaced from said second power means to provide fulcrum points for said shoes and to transmit force from one shoe to the other during independent activation of said second power means, said anchor means on said support providing reaction means for both independently and jointly engaging said shoes with the associated brake drum, said second power means being adapted to lift at least one shoe off of its anchor.

4. In a drum-type brake structure, a support plate, a pair of arcuate, oppositely disposed, brake shoes movably mounted on said support plate for limited circumferential movement and arranged to be radially expanded for braking engagement with a surrounding brake drum, anchor means on said support plate arranged between and shiftably supporting one pair of adjacent ends of said pair of brake shoes, a first shoe actuating means mounted on said support plate adjacent the other pair of adjacent ends of said pair of brake shoes operable to radially expand said other pair of brake shoe ends, a link floatingly mounted on said support plate and arranged to transmit thrust between said other pair of adjacent brake shoe ends, and a second shoe actuating means connected to and arranged to radially expand said one pair of brake shoe ends, said second shoe actuating means including a compressible energy storing means which functions substantially as a force transmitting means during independent operation of said second shoe actuating means and is compressed during simultaneous operation of said first and second shoe actuating means, said compressible energy storing means being expandible to radially separate said one pair of brake shoe ends when said first shoe actuating means is thereafter deactivated.

5. In a drum-type brake structure, a support plate, a pair of arcuate, oppositely disposed, brake shoes movably mounted on said support plate for limited circumferential movement and arranged to be radially expanded for braking engagement with a surrounding brake drum, anchor means on said support plate arranged between and shiftably supporting one pair of adjacent ends of said pair of brake shoes, a first shoe actuating means mounted on said support plate adjacent the other pair of adjacent ends of said pair of brake shoes operable to radially expand said other pair of brake shoe ends, a link floatingly mounted on said support plate and arranged to transmit thrust between said other pair of adjacent brake shoe ends, and a second shoe actuating means connected to and arranged to radially expand said one pair of brake shoe ends, said second shoe actuating means including a compressible energy storing means which functions substantially as a force transmitting means during independent operation of said second shoe actuating means and is compressed during simultaneous operation of said first and second shoe actuating means, said compressible energy storing means being expandible to radially separate said one pair of brake shoe ends when said first shoe actuating means is thereafter deactivated, said second shoe actuating means including an extensible length linkage extending between said one pair of brake shoe ends and a lever means connected to said extensible length linkage to operate said second shoe actuating means.

6. In a drum-type brake structure, a support plate, a pair of arcuate, oppositely disposed, brake shoes movably mounted on said support plate for limited circumferential movement and arranged to be radially expanded for braking engagement with a surrounding brake drum, anchor means on said support plate arranged between and shiftably supporting one pair of adjacent ends of said pair of brake shoes, a first shoe actuating means mounted on said support plate adjacent the other pair of adjacent ends of said pair of brake shoes operable to radially expand said other pair of brake shoe ends, a link floatingly mounted on said support plate and arranged to transmit thrust between said other pair of adjacent brake shoe ends, and a second shoe actuating means connected to and arranged to radially expand said one pair of brake shoe ends, said second shoe actuating means including a compressible energy storing means which functions substantially as a force transmitting means during independent operation of said second shoe actuating means and is compressed during simultaneous operation of said first and second shoe actuating means, said compressible energy storing means being expandible to radially separate said one pair of brake shoe ends when said first shoe actuating means is thereafter deactivated, said second shoe actuating means including an extensible length linkage extending between said one pair of brake shoe ends and a lever means connected to said extensible length linkage to operate said second shoe actuating means, said extensible length linkage comprising a pair of links interconnected by pin and slot connections.

7. In a drum-type brake structure, a support plate, a pair of arcuate, oppositely disposed, brake shoes movably mounted on said support plate for limited circumferential movement and arranged to be radially expanded for braking engagement with a surrounding brake drum, anchor means on said support plate arranged between and shiftably supporting one pair of adjacent ends of said pair of brake shoes, a first shoe actuating means mounted on said support plate adjacent the other pair of adjacent ends of said pair of brake shoes operable to radially expand said other pair of brake shoe ends, a link floatingly mounted on said support plate and arranged to transmit thrust between said other pair of adjacent brake shoe ends, and a second shoe actuating means connected to and arranged to radially expand said one pair of brake shoe ends, said second shoe actuating means including a compressible energy storing means which functions substantially as a force transmitting means during independent operation of said second shoe actuating means and is compressed during simultaneous operation of said first and second shoe actuating means, said compressible energy storing means being expandible to radially separate said one pair of brake shoe ends when said first shoe actuating means is thereafter deactivated, said second shoe actuating means including an extensible length linkage extending between said one pair of brake shoe ends and a lever means connected to said extensible length linkage to operate said second shoe actuating means, said extensible length linkage comprising a pair of links interconnected by pin and slot connections with said compressible energy storing means comprising a coil spring surrounding said linkage and abuttingly engage with the linkage at its opposite ends.

8. In a drum-type brake structure, a support plate, a pair of arcuate, oppositely disposed, brake shoes movably mounted on said support plate for limited circumferential movement and arranged to be radially expanded for braking engagement with a surrounding brake drum, anchor means on said support plate arranged between and shiftably supporting one pair of adjacent ends of said pair of brake shoes, a first shoe actuating means mounted on said support plate adjacent the other pair of adjacent ends of said pair of brake shoes operable to radially expand said other pair of brake shoe ends, a link floatingly mounted on said support plate and arranged to transmit thrust between said other pair of adjacent brake shoe ends, and a second shoe actuating means connected to and arranged to radially expand said one pair of brake shoe ends, said second shoe actuating means including a compressible energy storing means which functions substantially as a force transmitting means during independent operation of said second shoe actuating means and is compressed during simultaneous operation of said first and second shoe actuating means, said compressible energy storing means being expandible to radially separate said one pair of brake shoe ends when said first shoe actuating means is thereafter deactivated, said second shoe actuating means including an extensible length linkage extending between said one pair of brake shoe ends and a lever means connected to said extensible length linkage to operate said second shoe actuating means, said lever means being pivotally connected to one of said brake shoes and having portions fulcruming said extensible length linkage.

References Cited in the file of this patent

UNITED STATES PATENTS

| | | |
|---|---|---|
| 1,648,864 | Pugh | Nov. 8, 1927 |
| 1,739,783 | Christensen | Dec. 17, 1929 |
| 1,767,761 | Insul | June 24, 1930 |
| 1,944,490 | Bowen | Jan. 23, 1934 |
| 2,224,215 | Chartock et al. | Dec. 10, 1940 |